(12) United States Patent  (10) Patent No.: US 8,938,796 B2
Case, Sr.  (45) Date of Patent: Jan. 20, 2015

(54) CASE SECURE COMPUTER ARCHITECTURE

(71) Applicant: Paul Case, Sr., Pleasant Valley, NY (US)

(72) Inventor: Paul Case, Sr., Pleasant Valley, NY (US)

(*) Notice: Subject to any disclaimer, the term of this patent is extended or adjusted under 35 U.S.C. 154(b) by 0 days.

(21) Appl. No.: 14/026,054

(22) Filed: Sep. 13, 2013

(65) Prior Publication Data

US 2014/0082344 A1   Mar. 20, 2014

Related U.S. Application Data

(60) Provisional application No. 61/703,351, filed on Sep. 20, 2012, provisional application No. 61/752,127, filed on Jan. 14, 2013.

(51) Int. Cl.
*G06F 21/31* (2013.01)
*G06F 21/57* (2013.01)
*G06F 21/56* (2013.01)

(52) U.S. Cl.
CPC ............ *G06F 21/572* (2013.01); *G06F 21/567* (2013.01)
USPC .......................................................... 726/16

(58) Field of Classification Search
CPC ........... G06F 1/00; G06F 21/00; G06F 12/00; G06F 17/30
USPC .......................................................... 726/16
See application file for complete search history.

(56) References Cited

U.S. PATENT DOCUMENTS

| | | | |
|---|---|---|---|
| 4,152,761 A | 5/1979 | Louie | |
| 4,328,542 A | 5/1982 | Anastas et al. | |
| 4,530,049 A | 7/1985 | Zee | |
| 4,553,202 A | 11/1985 | Trufyn | |
| 4,634,807 A | 1/1987 | Chorley et al. | |
| 4,775,246 A | 10/1988 | Edelmann et al. | |
| 4,987,595 A | 1/1991 | Marino, Jr. et al. | |
| 5,029,206 A * | 7/1991 | Marino et al. ................. | 713/164 |
| 5,047,925 A | 9/1991 | Kun et al. | |
| 5,057,996 A | 10/1991 | Cutler et al. | |
| 5,075,884 A | 12/1991 | Sherman et al. | |
| 5,129,083 A | 7/1992 | Cutler et al. | |
| 5,129,084 A | 7/1992 | Kelly, Jr. et al. | |
| 5,136,712 A | 8/1992 | Perazzoli, Jr. et al. | |
| 5,187,790 A | 2/1993 | East et al. | |
| 5,297,283 A | 3/1994 | Kelly, Jr. et al. | |
| 5,311,591 A | 5/1994 | Fischer | |
| 5,321,841 A | 6/1994 | East et al. | |
| 5,367,571 A | 11/1994 | Bowen et al. | |
| 5,412,717 A | 5/1995 | Fischer | |
| 5,469,556 A | 11/1995 | Clifton | |

(Continued)

OTHER PUBLICATIONS

US 8,214,627, (withdrawn).

(Continued)

*Primary Examiner* — Teshome Hailu
*Assistant Examiner* — Thanh Le
(74) *Attorney, Agent, or Firm* — Jason H. Vick; Sheridan Ross, P.C.

(57) ABSTRACT

Two computing subsystems are disclosed, one a control subsystem, the other a user subsystem, each using engines with augmented conventional instruction sets, together with hardware and/or firmware, to compartmentalize execution of user programs to insure their behavior does not exceed defined bounds. Programs hidden in data cannot execute. User programs cannot alter the control program that manages the overall system.

20 Claims, 2 Drawing Sheets

(56) References Cited

U.S. PATENT DOCUMENTS

| | | |
|---|---|---|
| 5,504,814 A | 4/1996 | Miyahara |
| 5,581,700 A | 12/1996 | Witte |
| 5,581,763 A | 12/1996 | Hait |
| 5,598,562 A | 1/1997 | Cutler et al. |
| 5,630,057 A | 5/1997 | Hait |
| 5,745,757 A | 4/1998 | Lecourtier |
| 5,748,736 A | 5/1998 | Mittra |
| 5,867,647 A | 2/1999 | Haigh et al. |
| 5,870,473 A | 2/1999 | Boesch et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,949,973 A | 9/1999 | Yarom |
| 5,966,542 A | 10/1999 | Tock |
| 5,982,891 A | 11/1999 | Ginter et al. |
| 6,078,612 A | 6/2000 | Bertrand et al. |
| 6,098,171 A | 8/2000 | Johnson et al. |
| 6,144,739 A | 11/2000 | Witt et al. |
| 6,157,721 A | 12/2000 | Shear et al. |
| 6,237,786 B1 | 5/2001 | Ginter et al. |
| 6,240,493 B1 | 5/2001 | Hardwood, III et al. |
| 6,253,193 B1 | 6/2001 | Ginter et al. |
| 6,292,569 B1 | 9/2001 | Shear et al. |
| 6,311,270 B1 | 10/2001 | Challener et al. |
| 6,314,409 B2 | 11/2001 | Schneck et al. |
| 6,347,371 B1 | 2/2002 | Beelitz et al. |
| 6,363,488 B1 | 3/2002 | Ginter et al. |
| 6,370,648 B1 | 4/2002 | Diep |
| 6,385,727 B1 | 5/2002 | Cassagnol et al. |
| 6,389,402 B1 | 5/2002 | Ginter et al. |
| 6,424,953 B1 | 7/2002 | Glassman et al. |
| 6,427,140 B1 | 7/2002 | Ginter et al. |
| 6,434,627 B1 | 8/2002 | Millet et al. |
| 6,449,652 B1 | 9/2002 | Blumenau et al. |
| 6,480,961 B2 | 11/2002 | Rajasekharan et al. |
| 6,496,871 B1 | 12/2002 | Jagannathan |
| 6,499,092 B1 | 12/2002 | Harwood, III et al. |
| 6,507,904 B1 | 1/2003 | Ellison et al. |
| 6,621,492 B2 | 9/2003 | Brokenshire et al. |
| 6,624,810 B2 | 9/2003 | Brokenshire et al. |
| 6,628,284 B1 | 9/2003 | Fossum et al. |
| 6,647,400 B1 | 11/2003 | Moran |
| 6,651,171 B1 | 11/2003 | England et al. |
| 6,659,779 B1 | 12/2003 | Harris |
| 6,671,811 B1 | 12/2003 | Diep et al. |
| 6,678,825 B1 | 1/2004 | Ellison et al. |
| 6,708,086 B2 | 3/2004 | Richard |
| 6,751,737 B1 | 6/2004 | Russell et al. |
| 6,769,066 B1 | 7/2004 | Botros et al. |
| 6,773,267 B2 | 8/2004 | Haris et al. |
| 6,775,776 B1 | 8/2004 | Vogt et al. |
| 6,775,779 B1 | 8/2004 | England et al. |
| 6,782,349 B2 | 8/2004 | Challener et al. |
| 6,804,778 B1 | 10/2004 | Levi et al. |
| 6,813,522 B1 | 11/2004 | Schwarm et al. |
| 6,826,697 B1 | 11/2004 | Moran |
| 6,831,660 B1 | 12/2004 | Kipping et al. |
| 6,865,672 B1 | 3/2005 | Carmeli |
| 6,865,690 B2 | 3/2005 | Kocin |
| 6,871,232 B2 | 3/2005 | Curie et al. |
| 6,907,533 B2 | 6/2005 | Sorkin et al. |
| 6,917,364 B2 | 7/2005 | Nguyen |
| 6,918,103 B2 | 7/2005 | Alphey et al. |
| 6,924,802 B2 | 8/2005 | Fossum et al. |
| 6,928,549 B2 | 8/2005 | Brock et al. |
| 6,938,164 B1 | 8/2005 | England et al. |
| 6,941,458 B1 | 9/2005 | Ellison et al. |
| 6,947,989 B2 | 9/2005 | Bohren et al. |
| 6,948,070 B1 | 9/2005 | Ginter et al. |
| 6,957,332 B1 | 10/2005 | Ellison et al. |
| 6,976,175 B2 | 12/2005 | England et al. |
| 6,981,155 B1 | 12/2005 | Lyle et al. |
| 6,983,323 B2 | 1/2006 | Cantrell |
| 6,985,955 B2 | 1/2006 | Bohren et al. |
| 6,986,059 B2 | 1/2006 | England et al. |
| 6,993,581 B1 | 1/2006 | Blumenau et al. |
| 6,993,589 B1 | 1/2006 | Blumenau et al. |
| 6,996,710 B1 | 2/2006 | Ellison et al. |
| 6,996,843 B1 | 2/2006 | Moran |
| 7,013,484 B1 | 3/2006 | Ellison et al. |
| 7,020,772 B2 | 3/2006 | England et al. |
| 7,032,114 B1 | 4/2006 | Moran |
| 7,051,200 B1 | 5/2006 | Jakubowski et al. |
| 7,051,212 B2 | 5/2006 | Ginter et al. |
| 7,065,657 B1 | 6/2006 | Moran |
| 7,069,451 B1 | 6/2006 | Ginter et al. |
| 7,073,059 B2 | 7/2006 | Christian et al. |
| 7,073,070 B2 | 7/2006 | Girard |
| 7,076,652 B2 | 7/2006 | Ginter et al. |
| 7,076,655 B2 | 7/2006 | Chen et al. |
| 7,076,803 B2 | 7/2006 | Bruton, III et al. |
| 7,082,615 B1 | 7/2006 | Ellison et al. |
| 7,085,933 B2 | 8/2006 | Challener et al. |
| 7,085,935 B1 | 8/2006 | Ellison et al. |
| 7,085,936 B1 | 8/2006 | Moran |
| 7,089,373 B2 | 8/2006 | Day et al. |
| 7,089,418 B1 | 8/2006 | Ellison et al. |
| 7,095,854 B1 | 8/2006 | Ginter et al. |
| 7,095,859 B2 | 8/2006 | Challener |
| 7,096,497 B2 | 8/2006 | Ellison et al. |
| 7,100,199 B2 | 8/2006 | Ginter et al. |
| 7,103,914 B2 | 9/2006 | Focke et al. |
| 7,103,915 B2 | 9/2006 | Nemzow et al. |
| 7,111,176 B1 | 9/2006 | Ellison et al. |
| 7,117,374 B2 | 10/2006 | Hill et al. |
| 7,117,532 B1 | 10/2006 | Lyle et al. |
| 7,120,788 B2 | 10/2006 | Ramirez |
| 7,120,800 B2 | 10/2006 | Ginter et al. |
| 7,124,274 B2 | 10/2006 | Belnet et al. |
| 7,124,302 B2 | 10/2006 | Ginter et al. |
| 7,133,845 B1 | 11/2006 | Ginter et al. |
| 7,139,890 B2 | 11/2006 | Hall et al. |
| 7,146,499 B2 | 12/2006 | Yellepeddy |
| 7,146,529 B2 | 12/2006 | Aguilar, Jr. et al. |
| 7,149,862 B2 | 12/2006 | Tune et al. |
| 7,149,888 B1 * | 12/2006 | Hart et al. ............ 713/2 |
| 7,149,901 B2 | 12/2006 | Herbert et al. |
| 7,150,043 B2 | 12/2006 | Brock et al. |
| 7,150,045 B2 | 12/2006 | Koelle et al. |
| 7,152,193 B2 | 12/2006 | Cubiss et al. |
| 7,152,239 B1 | 12/2006 | Lyle et al. |
| 7,155,615 B1 | 12/2006 | Silvester |
| 7,159,086 B2 | 1/2007 | Bress et al. |
| 7,159,210 B2 | 1/2007 | Dalton et al. |
| 7,178,015 B2 | 2/2007 | Bouchier et al. |
| 7,181,603 B2 | 2/2007 | Maliszewski et al. |
| 7,185,159 B2 | 2/2007 | Beinet et al. |
| 7,194,623 B1 | 3/2007 | Balacheff et al. |
| 7,200,758 B2 | 4/2007 | Zimmer |
| 7,203,962 B1 | 4/2007 | Moran |
| 7,207,069 B2 | 4/2007 | Foster et al. |
| 7,209,137 B2 | 4/2007 | Brokenshire et al. |
| 7,212,199 B2 | 5/2007 | Fossum et al. |
| 7,216,369 B2 | 5/2007 | Grawrock et al. |
| 7,219,148 B2 | 5/2007 | Rounthwaite et al. |
| 7,222,366 B2 | 5/2007 | Bruton, III et al. |
| 7,225,334 B2 | 5/2007 | Bianchi |
| 7,225,343 B1 | 5/2007 | Eskin et al. |
| 7,228,434 B2 | 6/2007 | Zisowski |
| 7,231,476 B2 | 6/2007 | Chaussade et al. |
| 7,236,998 B2 | 6/2007 | Nutter et al. |
| 7,237,109 B2 | 6/2007 | Scott et al. |
| 7,240,137 B2 | 7/2007 | Aguilar, Jr. et al. |
| 7,240,182 B2 | 7/2007 | Day et al. |
| 7,249,162 B2 | 7/2007 | Rounthwaite et al. |
| 7,251,829 B1 | 7/2007 | Harding et al. |
| 7,266,475 B1 | 9/2007 | Bade et al. |
| 7,269,702 B2 | 9/2007 | Aday et al. |
| 7,269,825 B1 | 9/2007 | Adcock |
| 7,281,268 B2 | 10/2007 | Hollander et al. |
| 7,290,112 B2 | 10/2007 | Aguilar, Jr. et al. |
| 7,290,287 B2 | 10/2007 | Rodriguez et al. |
| 7,296,146 B2 | 11/2007 | Gandhi et al. |

(56) References Cited

U.S. PATENT DOCUMENTS

| | | |
|---|---|---|
| 7,302,480 B2 | 11/2007 | Lahtinen |
| 7,302,589 B2 | 11/2007 | Mangold et al. |
| 7,302,705 B1 | 11/2007 | Boivie |
| 7,303,059 B2 | 12/2007 | Pugh |
| 7,305,383 B1 | 12/2007 | Kubesh et al. |
| 7,305,534 B2 | 12/2007 | Watt et al. |
| 7,305,561 B2 | 12/2007 | Hunt et al. |
| 7,308,714 B2 | 12/2007 | Bardsley et al. |
| 7,313,825 B2 | 12/2007 | Nemzow et al. |
| 7,318,218 B2 | 1/2008 | Aguilar, Jr. et al. |
| 7,322,042 B2 | 1/2008 | Srinivasan et al. |
| 7,322,047 B2 | 1/2008 | Nemzow et al. |
| 7,334,154 B2 | 2/2008 | Douceur et al. |
| 7,334,264 B2 | 2/2008 | Takahashi |
| 7,340,573 B2 | 3/2008 | Watt |
| 7,356,678 B2 | 4/2008 | Gandhi et al. |
| 7,356,844 B2 | 4/2008 | Lyle et al. |
| 7,363,515 B2 | 4/2008 | Frazier et al. |
| 7,363,656 B2 | 4/2008 | Weber et al. |
| 7,367,055 B2 | 4/2008 | Comer et al. |
| 7,370,189 B2 | 5/2008 | Fischer et al. |
| 7,376,974 B2 | 5/2008 | Balacheff et al. |
| 7,380,275 B2 | 5/2008 | Srinivasan et al. |
| 7,380,278 B2 | 5/2008 | Ellison et al. |
| 7,386,414 B2 | 6/2008 | Aguilar, Jr. et al. |
| 7,386,708 B2 | 6/2008 | Bantz et al. |
| 7,389,425 B2 | 6/2008 | Brizek et al. |
| 7,389,427 B1 | 6/2008 | McKeen et al. |
| 7,389,508 B2 | 6/2008 | Aguilar, Jr. et al. |
| 7,389,537 B1 | 6/2008 | Callon et al. |
| 7,392,511 B2 | 6/2008 | Brokenshire et al. |
| 7,392,543 B2 | 6/2008 | Szor |
| 7,395,174 B2 | 7/2008 | Aguilar, Jr. et al. |
| 7,395,963 B2 | 7/2008 | Silverbrook et al. |
| 7,398,390 B2 | 7/2008 | Hyser |
| 7,406,542 B2 | 7/2008 | Erlingsson |
| 7,409,722 B2 | 8/2008 | Smith |
| 7,415,703 B2 | 8/2008 | Aguilar, Jr. et al. |
| 7,421,453 B2 | 9/2008 | Aguilar, Jr. et al. |
| 7,424,612 B2 | 9/2008 | England et al. |
| 7,424,735 B2 | 9/2008 | Sorkin et al. |
| 7,430,585 B2 | 9/2008 | Sibert |
| 7,437,761 B2 | 10/2008 | Takahashi |
| 7,441,712 B2 | 10/2008 | Silverbrook et al. |
| 7,444,632 B2 | 10/2008 | Minor et al. |
| 7,454,547 B1 | 11/2008 | Doppalapudi et al. |
| 7,461,249 B1 | 12/2008 | Chan et al. |
| 7,461,402 B1 | 12/2008 | Lyle et al. |
| 7,461,778 B2 | 12/2008 | Silverbrook et al. |
| 7,464,879 B2 | 12/2008 | Silverbrook et al. |
| 7,467,285 B2 | 12/2008 | Khosravi et al. |
| 7,467,370 B2 | 12/2008 | Balacheff et al. |
| 7,472,416 B2 | 12/2008 | Bage |
| 7,478,390 B2 | 1/2009 | Brokenshire et al. |
| 7,480,931 B2 | 1/2009 | Weiss |
| 7,484,105 B2 | 1/2009 | Goodman et al. |
| 7,484,247 B2 | 1/2009 | Cioffi et al. |
| 7,487,154 B2 | 2/2009 | Rogers et al. |
| 7,487,365 B2 | 2/2009 | England et al. |
| 7,487,367 B2 | 2/2009 | Belnet et al. |
| 7,490,017 B2 | 2/2009 | Aguilar, Jr. et al. |
| 7,490,350 B1 | 2/2009 | Martin et al. |
| 7,490,353 B2 | 2/2009 | Kohavi |
| 7,496,769 B2 | 2/2009 | Lampson et al. |
| 7,496,917 B2 | 2/2009 | Brokenshire et al. |
| 7,506,168 B2 | 3/2009 | Silverbrook et al. |
| 7,506,325 B2 | 3/2009 | Brokenshire et al. |
| 7,509,644 B2 | 3/2009 | Worley, Jr. |
| 7,509,683 B2 | 3/2009 | Decime |
| 7,512,530 B2 | 3/2009 | Aguilar, Jr. et al. |
| 7,512,699 B2 | 3/2009 | Gowen et al. |
| 7,512,982 B2 | 3/2009 | Takahashi |
| 7,516,456 B2 | 4/2009 | Aguilar, Jr. et al. |
| 7,519,831 B2 | 4/2009 | LeQuere |
| 7,523,157 B2 | 4/2009 | Aguilar, Jr. et al. |
| 7,529,242 B1 | 5/2009 | Lyle |
| 7,530,103 B2 | 5/2009 | England et al. |
| 7,537,157 B2 | 5/2009 | Silverbrook et al. |
| 7,540,026 B1 | 5/2009 | Ferrie et al. |
| 7,543,335 B2 | 6/2009 | England et al. |
| 7,546,447 B2 | 6/2009 | Chen et al. |
| 7,549,145 B2 | 6/2009 | Aguilar, Jr. et al. |
| 7,550,868 B2 | 6/2009 | Capdevila et al. |
| 7,551,615 B2 | 6/2009 | Eldar et al. |
| 7,552,196 B2 | 6/2009 | Levi et al. |
| 7,552,326 B2 | 6/2009 | Liu et al. |
| 7,552,346 B2 | 6/2009 | Aguilar, Jr. et al. |
| 7,552,482 B2 | 6/2009 | Nemzow et al. |
| 7,555,617 B2 | 6/2009 | Himbeeck et al. |
| 7,558,832 B2 | 7/2009 | Rounthwaite et al. |
| 7,565,549 B2 | 7/2009 | Hackenberger et al. |
| 7,565,659 B2 | 7/2009 | Day et al. |
| 7,568,114 B1 | 7/2009 | Schlafly |
| 7,571,312 B2 | 8/2009 | Scarlata et al. |
| 7,574,608 B2 | 8/2009 | Rodriguez et al. |
| 7,577,742 B1 | 8/2009 | Prohofsky |
| 7,581,252 B2 | 8/2009 | Challener et al. |
| 7,581,253 B2 | 8/2009 | Challener et al. |
| 7,587,595 B2 | 9/2009 | Rozas et al. |
| 7,591,003 B2 | 9/2009 | Focke et al. |
| 7,593,413 B2 | 9/2009 | Raisch |
| 7,594,124 B2 | 9/2009 | Durham et al. |
| 7,594,258 B2 | 9/2009 | Mao et al. |
| 7,596,430 B2 | 9/2009 | Aguilar, Jr. et al. |
| 7,600,261 B2 | 10/2009 | Wray |
| 7,603,716 B2 | 10/2009 | Duffus et al. |
| 7,613,861 B2 | 11/2009 | Rangarajan et al. |
| 7,613,917 B1 | 11/2009 | Chojnacki |
| 7,613,937 B2 | 11/2009 | Boyum et al. |
| 7,620,177 B2 | 11/2009 | Ibrahim et al. |
| 7,620,727 B2 | 11/2009 | Dobtchev |
| 7,620,951 B2 | 11/2009 | Brokenshire et al. |
| 7,627,898 B2 | 12/2009 | Beck et al. |
| 7,631,196 B2 | 12/2009 | Grawrock et al. |
| 7,631,342 B2 | 12/2009 | Focke et al. |
| 7,634,655 B2 | 12/2009 | Kaniyar et al. |
| 7,637,419 B2 | 12/2009 | Silverbrook et al. |
| 7,640,313 B2 | 12/2009 | Rounthwaite et al. |
| 7,640,438 B2 | 12/2009 | Rao et al. |
| 7,641,124 B2 | 1/2010 | Brown et al. |
| 7,653,727 B2 | 1/2010 | Durham et al. |
| 7,653,908 B2 | 1/2010 | Aguilar, Jr. et al. |
| 7,657,757 B2 | 2/2010 | Feldman |
| 7,657,927 B2 | 2/2010 | Fraser et al. |
| 7,660,769 B2 | 2/2010 | Shimizu |
| 7,661,105 B2 | 2/2010 | Belnet et al. |
| 7,663,789 B2 | 2/2010 | Silverbrook et al. |
| 7,664,965 B2 | 2/2010 | Bade et al. |
| 7,676,382 B2 | 3/2010 | Silverbrook et al. |
| 7,677,445 B2 | 3/2010 | Silverbrook et al. |
| 7,681,800 B2 | 3/2010 | Silverbrook et al. |
| 7,684,563 B1 | 3/2010 | Olson et al. |
| 7,685,436 B2 | 3/2010 | Davis et al. |
| 7,685,644 B2 | 3/2010 | John et al. |
| 7,694,150 B1 | 4/2010 | Kirby |
| 7,694,306 B2 | 4/2010 | Minor et al. |
| 7,698,089 B2 | 4/2010 | Aguilar, Jr. et al. |
| 7,702,922 B2 | 4/2010 | Hetzler |
| 7,703,507 B2 | 4/2010 | Strickland |
| 7,712,143 B2 | 5/2010 | Comlekoglu |
| 7,716,494 B2 | 5/2010 | Liu et al. |
| 7,716,726 B2 | 5/2010 | Frank et al. |
| 7,716,727 B2 | 5/2010 | Frank et al. |
| 7,720,219 B1 | 5/2010 | Olson et al. |
| 7,721,341 B2 | 5/2010 | England et al. |
| 7,721,344 B2 | 5/2010 | Nemzow et al. |
| 7,721,345 B2 | 5/2010 | Nemzow et al. |
| 7,725,703 B2 | 5/2010 | England et al. |
| 7,730,248 B2 | 6/2010 | Conti et al. |
| 7,730,318 B2 | 6/2010 | England et al. |
| 7,730,537 B2 | 6/2010 | Bardsley et al. |
| 7,733,117 B1 | 6/2010 | Priel et al. |
| 7,735,135 B1 | 6/2010 | Zhou |
| 7,735,137 B2 | 6/2010 | Baik et al. |

(56) References Cited

U.S. PATENT DOCUMENTS

| | | |
|---|---|---|
| 7,739,517 B2 | 6/2010 | Durham et al. |
| 7,739,724 B2 | 6/2010 | Durham et al. |
| 7,743,257 B2 | 6/2010 | Rabeler |
| 7,743,418 B2 | 6/2010 | Clift et al. |
| 7,748,006 B2 | 6/2010 | Aguilar, Jr. et al. |
| 7,752,350 B2 | 7/2010 | Brokenshire et al. |
| 7,752,428 B2 | 7/2010 | Datta et al. |
| 7,752,466 B2 | 7/2010 | Ginter et al. |
| 7,756,272 B2 | 7/2010 | Carter et al. |
| 7,756,666 B2 | 7/2010 | Aguilar, Jr. et al. |
| 7,765,160 B2 | 7/2010 | Niles et al. |
| 7,765,342 B2 | 7/2010 | Whalley et al. |
| 7,765,392 B2 | 7/2010 | Brannock et al. |
| 7,765,595 B2 | 7/2010 | Focke et al. |
| 7,769,998 B2 | 8/2010 | Lynch et al. |
| 7,770,008 B2 | 8/2010 | Walmsley |
| 7,774,462 B2 | 8/2010 | Dawson et al. |
| 7,778,420 B2 | 8/2010 | Carter et al. |
| 7,783,666 B1 | 8/2010 | Zhuge et al. |
| 7,784,096 B2 | 8/2010 | Huitema et al. |
| 7,784,681 B2 | 8/2010 | Silverbrook et al. |
| 7,788,433 B2 | 8/2010 | Henry et al. |
| 7,788,699 B2 | 8/2010 | Largman et al. |
| 7,788,724 B2 | 8/2010 | Gabriel et al. |
| 7,797,566 B2 | 9/2010 | Dror et al. |
| 7,797,597 B2 * | 9/2010 | Roohparvar .............. 714/723 |
| 7,801,742 B2 | 9/2010 | Silverbrook et al. |
| 7,802,111 B1 | 9/2010 | Tahan |
| 7,802,232 B2 | 9/2010 | Berger et al. |
| 7,809,135 B2 | 10/2010 | Johnson et al. |
| 7,809,138 B2 | 10/2010 | Shamoon et al. |
| 7,814,310 B2 | 10/2010 | Bouchard et al. |
| 7,814,543 B2 | 10/2010 | Chandley et al. |
| 7,814,554 B1 | 10/2010 | Ragner |
| 7,814,970 B2 | 10/2010 | Strickland |
| 7,815,109 B2 | 10/2010 | Silverbrook et al. |
| 7,818,781 B2 | 10/2010 | Field et al. |
| 7,827,326 B2 | 11/2010 | Bosch et al. |
| 7,827,359 B2 | 11/2010 | Carmichael |
| 7,827,371 B2 | 11/2010 | Yao et al. |
| 7,827,605 B2 | 11/2010 | Lyle et al. |
| 7,832,002 B2 | 11/2010 | Chevreau et al. |
| 7,836,219 B1 | 11/2010 | Mahmoud et al. |
| 7,836,299 B2 | 11/2010 | England et al. |
| 7,840,637 B2 | 11/2010 | Adelman et al. |
| 7,840,763 B2 | 11/2010 | Martin et al. |
| 7,844,835 B2 | 11/2010 | Ginter et al. |
| 7,845,008 B2 | 11/2010 | Davis et al. |
| 7,854,005 B2 | 12/2010 | Lyle et al. |
| 7,854,386 B2 | 12/2010 | Silverbrook et al. |
| 7,856,663 B2 | 12/2010 | Rodriguez et al. |
| 7,860,986 B1 | 12/2010 | Blumenau et al. |
| 7,865,876 B2 | 1/2011 | Chen et al. |
| 7,870,336 B2 | 1/2011 | Abadi et al. |
| 7,877,602 B2 | 1/2011 | French et al. |
| 7,877,734 B2 | 1/2011 | Branda et al. |
| 7,877,799 B2 | 1/2011 | Proudler |
| 7,882,556 B2 | 2/2011 | Ahn et al. |
| 7,886,065 B1 | 2/2011 | Hernacki et al. |
| 7,886,098 B2 | 2/2011 | Biles et al. |
| 7,886,150 B2 | 2/2011 | Stollon et al. |
| 7,886,162 B2 | 2/2011 | Murase et al. |
| 7,890,591 B2 | 2/2011 | Agrawal et al. |
| 7,890,771 B2 | 2/2011 | England et al. |
| 7,899,987 B2 * | 3/2011 | Salomon et al. .............. 711/112 |
| 7,900,059 B2 | 3/2011 | Bade et al. |
| 7,900,819 B2 | 3/2011 | Silverbrook et al. |
| 7,904,278 B2 | 3/2011 | Hein et al. |
| 7,905,401 B2 | 3/2011 | Silverbrook et al. |
| 7,908,656 B1 | 3/2011 | Mu |
| 7,913,924 B2 | 3/2011 | Silverbrook et al. |
| 7,917,605 B1 | 3/2011 | McQuarrie |
| 7,917,716 B2 | 3/2011 | Berenbaum et al. |
| 7,917,749 B2 | 3/2011 | Ginter et al. |
| 7,921,151 B2 | 4/2011 | Aguilar, Jr. et al. |
| 7,921,453 B2 | 4/2011 | Agosta et al. |
| 7,921,460 B1 | 4/2011 | Callon et al. |
| 7,921,463 B2 | 4/2011 | Lord et al. |
| 7,922,075 B2 | 4/2011 | Silverbrook et al. |
| 7,926,116 B2 | 4/2011 | Kamath et al. |
| 7,930,360 B2 | 4/2011 | Sibert |
| 7,930,728 B2 | 4/2011 | Rothman et al. |
| 7,934,036 B2 | 4/2011 | Conti et al. |
| 7,934,063 B2 | 4/2011 | Murase et al. |
| 7,934,254 B2 | 4/2011 | Graham |
| RE42,382 E | 5/2011 | Weiss |
| 7,937,757 B2 | 5/2011 | Focke et al. |
| 7,941,828 B2 | 5/2011 | Jauer |
| 7,945,786 B2 | 5/2011 | Kumar et al. |
| 7,945,789 B2 | 5/2011 | Nutter et al. |
| 7,946,487 B2 | 5/2011 | Silverbrook et al. |
| 7,954,157 B2 | 5/2011 | Niles et al. |
| 7,962,349 B2 | 6/2011 | Silverbrook et al. |
| 7,962,738 B2 | 6/2011 | Rasheed et al. |
| 7,962,766 B2 | 6/2011 | Fagan |
| 7,966,465 B2 | 6/2011 | Rodgers |
| 7,966,483 B2 | 6/2011 | Denpo |
| 7,966,664 B2 | 6/2011 | Makkinejad |
| 7,980,467 B2 | 7/2011 | Silverbrook et al. |
| 7,984,075 B2 | 7/2011 | Aguilar, Jr. et al. |
| 7,984,286 B2 | 7/2011 | Cui et al. |
| 7,984,304 B1 | 7/2011 | Agesen et al. |
| 7,984,509 B2 | 7/2011 | Ginter et al. |
| 7,996,669 B2 | 8/2011 | Chan et al. |
| 8,001,348 B2 | 8/2011 | Doran et al. |
| 8,001,390 B2 | 8/2011 | Hatakeyama |
| 8,001,596 B2 | 8/2011 | Bostanci et al. |
| 8,005,888 B2 | 8/2011 | Lamport |
| 8,006,087 B2 | 8/2011 | Ginter et al. |
| 8,006,103 B2 | 8/2011 | Herrell |
| 8,009,829 B2 | 8/2011 | Jueneman et al. |
| 8,010,772 B2 | 8/2011 | Kershaw et al. |
| 8,010,804 B2 | 8/2011 | Murase et al. |
| 8,019,866 B2 | 9/2011 | Tonnesen |
| 8,020,192 B2 | 9/2011 | Wright et al. |
| 8,024,581 B2 | 9/2011 | Spalka et al. |
| 8,024,691 B2 | 9/2011 | Boule et al. |
| 8,024,770 B2 | 9/2011 | Dillaway et al. |
| 8,032,764 B2 | 10/2011 | Paksoy et al. |
| 8,032,871 B2 | 10/2011 | Brokenshire et al. |
| 8,032,942 B2 | 10/2011 | Brutch et al. |
| 8,036,378 B2 | 10/2011 | Ciet et al. |
| 8,037,893 B2 | 10/2011 | Aguilar, Jr. et al. |
| 8,042,190 B2 | 10/2011 | Sahita et al. |
| 8,046,755 B2 | 10/2011 | Gaa-Frost et al. |
| 8,051,097 B2 | 11/2011 | Betouin et al. |
| 8,051,467 B2 | 11/2011 | Renno |
| 8,055,828 B2 | 11/2011 | Conti et al. |
| 8,055,910 B2 | 11/2011 | Kocher et al. |
| 8,055,912 B2 | 11/2011 | Bade et al. |
| 8,056,121 B2 | 11/2011 | Hamilton, II et al. |
| 8,060,607 B2 | 11/2011 | Tonnesen |
| 8,060,876 B2 | 11/2011 | Brutch et al. |
| 8,069,290 B2 | 11/2011 | Conti et al. |
| 8,074,231 B2 | 12/2011 | Carbin et al. |
| 8,074,276 B1 | 12/2011 | Beloussov et al. |
| 8,086,480 B2 | 12/2011 | Deo et al. |
| 8,086,844 B2 | 12/2011 | Buer et al. |
| RE43,103 E | 1/2012 | Cioffi et al. |
| RE43,119 E | 1/2012 | Chu |
| 8,090,940 B1 | 1/2012 | Fenton et al. |
| 8,091,078 B2 | 1/2012 | Brokenshire et al. |
| 8,094,816 B2 | 1/2012 | Ciet et al. |
| 8,095,802 B2 | 1/2012 | Nutter et al. |
| 8,096,466 B2 | 1/2012 | Silverbrook et al. |
| 8,099,605 B1 | 1/2012 | Billsrom et al. |
| 8,103,883 B2 | 1/2012 | Smith |
| 8,108,498 B2 | 1/2012 | Kunchipudi et al. |
| 8,108,905 B2 | 1/2012 | Johns et al. |
| RE43,171 E | 2/2012 | Chu |
| 8,111,431 B2 | 2/2012 | Silverbrook et al. |
| 8,117,367 B2 | 2/2012 | Conti et al. |
| 8,117,639 B2 | 2/2012 | Looney et al. |
| 8,122,235 B2 | 2/2012 | Holmberg, Jr. et al. |

(56) References Cited

U.S. PATENT DOCUMENTS

| | | |
|---|---|---|
| 8,126,957 B2 | 2/2012 | Gowen et al. |
| 8,127,015 B2 | 2/2012 | Lindsay et al. |
| 8,127,412 B2 | 3/2012 | Bakke et al. |
| 8,130,952 B2 | 3/2012 | Hill et al. |
| 8,131,784 B1 | 3/2012 | Mu et al. |
| 8,131,989 B2 | 3/2012 | Fischer et al. |
| 8,132,073 B1 | 3/2012 | Bowers et al. |
| 8,132,259 B2 | 3/2012 | Anderson et al. |
| 8,135,838 B2 | 3/2012 | Geist |
| 8,136,167 B1 | 3/2012 | Baluja et al. |
| 8,140,780 B2 | 3/2012 | Noyes |
| 8,140,825 B2 | 3/2012 | Balakrishnan et al. |
| 8,141,164 B2 | 3/2012 | Kamath et al. |
| 8,141,165 B2 | 3/2012 | Ginter et al. |
| 8,141,865 B2 | 3/2012 | Utagawa et al. |
| 8,146,084 B1 | 3/2012 | Meketa |
| 8,152,072 B2 | 4/2012 | Lapstun et al. |
| 8,156,230 B2 | 4/2012 | Bakket et al. |
| 8,160,975 B2 | 4/2012 | Tang et al. |
| 8,161,258 B2 | 4/2012 | Doran et al. |
| 8,161,463 B2 | 4/2012 | Gu et al. |
| 8,161,554 B2 | 4/2012 | Sadhasivam et al. |
| 8,166,304 B2 | 4/2012 | Murase et al. |
| 8,171,309 B1 | 5/2012 | Burd et al. |
| 8,171,336 B2 | 5/2012 | Priel et al. |
| 8,171,554 B2 | 5/2012 | Elovici et al. |
| 8,171,558 B2 | 5/2012 | Botz |
| 8,175,266 B2 | 5/2012 | Ciet et al. |
| 8,176,563 B2 | 5/2012 | Redlich et al. |
| 8,181,248 B2 | 5/2012 | Lee et al. |
| 8,185,749 B2 | 5/2012 | Ciet et al. |
| 8,190,868 B2 | 5/2012 | Schneider |
| 8,190,914 B2 | 5/2012 | Cox et al. |
| 8,190,917 B2 | 5/2012 | Nutter et al. |
| 8,191,126 B2 | 5/2012 | Raghavan |
| 8,191,157 B2 | 5/2012 | Ginter et al. |
| 8,191,158 B2 | 5/2012 | Ginter et al. |
| 8,195,984 B2 | 6/2012 | Alberi et al. |
| 8,201,244 B2 | 6/2012 | Chu et al. |
| 8,205,260 B2 | 6/2012 | Baxter et al. |
| 8,209,510 B1 | 6/2012 | Thathapudi et al. |
| 8,209,521 B2 | 6/2012 | Huggins et al. |
| 8,209,542 B2 | 6/2012 | Gueron et al. |
| RE43,500 E | 7/2012 | Cioffi et al. |
| RE43,528 E | 7/2012 | Cioffi et al. |
| RE43,529 E | 7/2012 | Cioffi et al. |
| 8,213,618 B2 | 7/2012 | Dewan |
| 8,214,298 B2 | 7/2012 | McCown |
| 8,219,981 B2 | 7/2012 | Aguilar, Jr. et al. |
| 8,220,029 B2 | 7/2012 | Seifert et al. |
| 8,220,062 B1 | 7/2012 | Arankalle et al. |
| 8,224,044 B2 | 7/2012 | Benkley, III |
| 8,225,093 B2 | 7/2012 | Fok et al. |
| 8,225,101 B2 | 7/2012 | Durham et al. |
| 8,225,110 B2 | 7/2012 | Loreskar et al. |
| 8,225,392 B2 | 7/2012 | Dubrovsky et al. |
| 8,225,398 B2 | 7/2012 | Durie |
| 8,230,509 B2 | 7/2012 | Gassoway |
| 8,239,918 B1 | 8/2012 | Cohen |
| 8,239,925 B2 | 8/2012 | Faitelson et al. |
| 8,239,945 B2 | 8/2012 | Boulanger et al. |
| 8,241,115 B2 | 8/2012 | Hamlin et al. |
| 8,250,373 B2 | 8/2012 | Hyser |
| 8,255,991 B1 | 8/2012 | Hackborn et al. |
| 8,261,085 B1 | 9/2012 | Fernandez-Gutierrez |
| 8,261,090 B1 | 9/2012 | Matsuoka |
| 8,261,320 B1 | 9/2012 | Serenyi et al. |
| 8,266,597 B2 | 9/2012 | Panchamukhi et al. |
| 8,266,670 B1 | 9/2012 | Merkow et al. |
| 8,266,676 B2 | 9/2012 | Hardjono et al. |
| 8,272,059 B2 | 9/2012 | Freeman |
| 8,275,442 B2 | 9/2012 | Allison |
| 8,276,164 B2 | 9/2012 | Munshi et al. |
| 8,281,135 B2 | 10/2012 | Smith |
| 8,281,395 B2 | 10/2012 | Pawlowski |
| 8,281,402 B2 | 10/2012 | Sahita et al. |
| 8,285,561 B2 | 10/2012 | Silverbrook et al. |
| 8,286,004 B2 | 10/2012 | Williams |
| 8,286,196 B2 | 10/2012 | Munshi et al. |
| 8,286,222 B2 | 10/2012 | Silverbrook et al. |
| 8,286,233 B1 | 10/2012 | Boland et al. |
| 8,286,245 B2 | 10/2012 | Samman |
| 8,386,695 B2 * | 2/2013 | Gorobets et al. ............... 711/103 |
| 2002/0194086 A1 | 12/2002 | Griffin et al. |
| 2002/0194132 A1 | 12/2002 | Chu |
| 2002/0194482 A1 | 12/2002 | Griffin et al. |
| 2002/0194493 A1 | 12/2002 | Dalton |
| 2002/0194496 A1 | 12/2002 | Griffin et al. |
| 2003/0126059 A1 | 7/2003 | Hensley et al. |
| 2003/0187853 A1 | 10/2003 | Hensley et al. |
| 2003/0226040 A1 | 12/2003 | Challener et al. |
| 2004/0025016 A1 | 2/2004 | Focke et al. |
| 2004/0250036 A1 | 12/2004 | Willman et al. |
| 2005/0033980 A1 | 2/2005 | Willman et al. |
| 2005/0114687 A1 | 5/2005 | Zimmer et al. |
| 2006/0114917 A1 | 6/2006 | Raisch |
| 2006/0236125 A1 | 10/2006 | Sahita et al. |
| 2007/0005919 A1 * | 1/2007 | van Riel ........................ 711/163 |
| 2007/0056036 A1 | 3/2007 | Focke et al. |
| 2007/0056037 A1 | 3/2007 | Focke et al. |
| 2007/0106993 A1 | 5/2007 | Largman et al. |
| 2007/0118900 A1 | 5/2007 | Focke et al. |
| 2007/0118901 A1 | 5/2007 | Focke et al. |
| 2007/0118902 A1 | 5/2007 | Focke et al. |
| 2007/0130458 A1 | 6/2007 | Focke et al. |
| 2008/0077749 A1 * | 3/2008 | Cohen ........................ 711/152 |
| 2008/0155184 A1 | 6/2008 | Gorobets et al. |
| 2008/0155277 A1 | 6/2008 | Bulusu et al. |
| 2009/0113146 A1 | 4/2009 | Minz et al. |
| 2009/0241109 A1 | 9/2009 | Vandegrift et al. |
| 2009/0282268 A1 | 11/2009 | Durham et al. |
| 2010/0107218 A1 | 4/2010 | Kurien et al. |
| 2010/0262637 A1 * | 10/2010 | Akagawa et al. .............. 707/822 |
| 2011/0141124 A1 | 6/2011 | Halls et al. |
| 2011/0145418 A1 | 6/2011 | Pratt et al. |
| 2011/0145458 A1 | 6/2011 | Narasimhan |
| 2011/0145819 A1 | 6/2011 | McKenzie et al. |
| 2011/0145820 A1 | 6/2011 | Pratt et al. |
| 2011/0145821 A1 | 6/2011 | Philipson et al. |
| 2011/0145886 A1 | 6/2011 | McKenzie et al. |
| 2011/0145916 A1 | 6/2011 | McKenzie et al. |
| 2011/0145923 A1 | 6/2011 | Largman et al. |
| 2011/0154500 A1 | 6/2011 | Sahita et al. |
| 2012/0185680 A1 | 7/2012 | Buer |
| 2012/0254498 A1 * | 10/2012 | Hatfield et al. ............... 711/102 |

OTHER PUBLICATIONS

Carter, Ashton et al. "A Law to Strengthen Our Cyberdefense" The New York Times op-Ed, Aug. 1, 2012, http://www.nytimes.com/2012/08/02/opinion/a-law-to-strengthen-our-cyberdefense.html.
International Search Report for International Application No. PCT/US2013/059629, mailed May 23, 2014.
Written Opinion for International Application No. PCT/US2013/059629, mailed May 23, 2014.
Invitation to Pay Additional Fees and, Where Applicable, Protest Fee, for International Application No. PCT/US2013/059629, mailed Feb. 28, 2014.

* cited by examiner

CASE SECURE COMPUTER ARCHITECTURE

RELATED APPLICATION DATA

This application claims the benefit of and priority under 35 U.S.C. §119(e) to U.S. Patent Application Ser. No. 61/703,351, filed Sep. 20, 2012, entitled "Case Secure Computer Architecture," and U.S. Patent Application Ser. No. 61/752,127, filed Jan. 14, 2013, entitled "Case Secure Computer Architecture," each of which are incorporated herein by reference in their entirety.

FIELD

One exemplary embodiment includes two computing subsystems, one a control subsystem, the other a user subsystem, each using engines with augmented conventional instruction sets, together with hardware and/or firmware, to compartmentalize execution of user programs to insure their behavior does not exceed defined bounds. Programs hidden in data cannot execute. User programs cannot alter the control program that manages the overall system.

BACKGROUND

The ubiquitous use of the Internet for communication between computer installations has enabled unwanted, sometimes enormously damaging, rogue programs to unknowingly enter into computing systems. This is considered a major national security risk. (See NY Times Aug. 2, 2012 op-Ed by A. B. Carter, deputy secretary of Defense and J. H. Lute, deputy secretary of Homeland Security.)

The designers of conventional computer architectures and of the Internet did not foresee the need to provide more secure systems. An exemplary embodiment of this invention corrects that oversight for computing systems.

SUMMARY

Computer systems require a set of core programs that initiate and oversee the execution of user programs, organize and control access to the libraries of information used in the system, and facilitate operational control of the system. We refer to this set of instructions as the control program. The integrity of the control program and its data is essential to maintain the integrity and security of the overall system.

An exemplary embodiment of this invention provides a separate processing subsystem dedicated to exclusive use by the control program. This control subsystem has a dedicated computing engine (CPU) as are its associated memory and optional storage. There is no connection of this engine to the Internet. This section of the computer system is connected to the user processing subsystem(s) via a hardware interface that does not allow the user programs to access the control program memory or storage. This isolation ensures complete integrity of the control program. Knowledge about the organization of the system's library of information resides in the control program's information database, which is accessible only to the control program. User programs and data are restricted to reside and execute in a user subsystem, which includes one or more engines (CPU's) user memory (memories), and user storage(s). Cooperation of the control program is required for a user programs to execute in their processor(s), or to access information in user libraries. User program execution is initiated, supervised, and terminated by the control program, which is assisted by hardware/firmware interface circuits. Incoming information, such as from the Internet, arrives in user memory and is classified as data and cannot execute. (Prearranged, known programs from trusted sources can be imported from the Internet by use of encryption). Information classification in the user subsystem separates data and instructions. Instructions are read-only, whereas data may be classified as read-only or read/write.

This redesign of the Von Neumann computer architecture, called the Case Secure Computer Architecture, compromises the generality of the VanNeumann model in fundamental ways that provide controls over the execution and integrity of programs, thereby eliminating the disruption of normal operations by rogue programs, including clandestine programs concealed in information received from eternal sources, such as the Internet. This exemplary goal is achieved by (1) providing a separate computing engine, memory, and optional storage for the Control Program (and for its data) to isolate it from disruption by activity in a user computing engine(s), (2) providing hardware enforced separation of user programs and their data, preventing programs masquerading as data from executing, (3) compartmentalizing user programs with hardware-enforced limits of their execution and data access, (4) providing hardware that enables the control program to oversee the execution of user programs to detect then prevent and/or terminate unwanted behavior which might snarl or monopolize the system. The computer is therefore not only secure from malicious intrusion, but also protected from a class of problems that can be caused by errors (bugs) in user programs. This enables the coding of simpler, and this more reliable, control and user programs.

Exemplary aspects of the invention are directed toward:

1. A Computer system architecture comprised of two subsystems, a control subsystem for executing the programs that control the operation of the entire system, and a user subsystem that executes user programs and stores user programs and data. The control subsystem contains the instructions and data that are necessary and sufficient to regulate the secure operation of the overall system. The control subsystem has a dedicated processor/CPU, memory, and, optionally, storage, and is empowered to control the user system's program execution and user data access.

2. The computer architecture, as in aspect 1, that provides a hardware/firmware interface between the control subsystem and the user subsystem that insulates the control subsystem form any interference by the user subsystem, and controls the dispatching and execution of user programs in the user subsystem in response to commands and data from the control subsystem, and relays information from the user subsystem to the control subsystem.

3. A computer system architecture as in aspect 1 or in aspect 2, that enforces the classification of user information in the user subsystem into either data or instructions, treating instructions as read-only and data as either read-only or read-write.

4. System architecture, as in aspect 3 that enables incoming Internet or other external data sources to be treated as data, preventing its execution as instructions.

5. Computer architecture, as in aspect 2, that enables the CPU in the control subsystem to dynamically have read-write access the memory and storage contained in the user subsystem.

6. An architecture, as in aspect 3 that can maintain security despite allowing the execution of a conventional internet browser in the user subsystem. Execution of the browser can be tolerated by having the control program set the memory address space congruently for program and data access, and, since no other access to memory or storage is allowed by this architecture, and if all the contents of the browser partition are erased following the execution, then any malware that might have entered the system has been destroyed and eliminated from the system.

Additional exemplary aspects of the invention are directed toward:

1. A computer system architecture, processing function and method wherein the CONTROL PROGRAM resides and executes in a separate subsystem consisting of one or more CPU(s), associated MEMORY(ies), and (optionally) STORAGE, and wherein this separate control subsystem is protected by hardware and/or firmware from access by programs located in other parts of the overall system. The MEMORY and optional STORAGE of the control subsystem contain the programs and data that constitute the information required to manage, supervise, and support the overall system. The CONTROL PROGRAM has access to the information in the remainder of the system, and the ability to control the processes and the information in the rest of the system.

2. A computer system architecture, processing function and method as in aspect 1, wherein there is a second (user) subsystem, consisting of one or more CPU(s), MEMORY(ies), and optional STORAGE, providing a facility for the execution and storage of user programs and user data and/or databases; and wherein there is a hardware and/or firmware interface between the control subsystem and the user subsystem which facilitates the ability of the control subsystem to manage and control the user subsystem, and buffers the control subsystem from the user subsystem, and enables communication between the two subsystems.

3. A computer system architecture, processing system and method wherein user program instructions are able to be controlled by hardware and/or firmware to be read-only, preventing instructions from modification during loading or execution.

4. A computer system architecture, processing function and method wherein, by hardware and/or firmware, data is distinguished from instructions, enabling these two classes of information to be treated separately.

5. A computer system architecture, processing function and method wherein hardware and/or firmware limit the dynamic addresses employed during the execution of a program to values specified by the CONTROL PROGRAM.

6. A computer system architecture, processing function and method as in aspects 2-5, the totality of which provides an architecture capable of achieving a previously unavailable level of security.

7. A computer system architecture, processing function and method as in aspect 2, wherein the user MEMORY(ies) and (optional) STORAGE utilize a virtual memory organization, and unique, separate, virtual memories are used for programs and for data.

8. A computer system architecture, processing function and method as in aspect 2, wherein the addressing scheme utilizes instruction set tags to identify segments within a partition. Segments may be data or instruction segments, and the tags enable relative addressing to be used for each segment.

9. A computer system architecture, processing function and method as in aspect 1, wherein the control subsystem contains not only the CPU running the kernel CONTROL PROGRAM, but additional CPU(s) and, optionally, additional MEMORY(ies), are available for executing secure system services such as encryption, storage of information, or for backup or other purposes.

Definitions

"CONTROL BLOCK" or "TASK CONTROL BLOCK", as used herein refers to a set of data, in CPU 1 MEMORY, containing the information used/needed by the CONTROL PROGRAM and the HARDWARE INTERFACE/CPUn DISPATCHER to record and share the parameters needed to define and control a task that executes in CPUn.

CPU (Central Processing Unit) as used herein is equivalent to "processor(s)" or "core(s)" or "core processor" or "computing unit(s)" or "computing engine(s)", or "engine(s)."

CONTROL PROGRAM as used herein is equivalent to "operating system" and/or "kernel" and/or "Shell program", and refers to the programs used to manage the processes and data for the overall system.

MEMORY, as used herein, refers to primary digital storage which at least holds groups of instructions and data available for fast access for execution; and includes "RAM", "DRAM", "SRAM", "T-RAM", "TT-RAM", "Z-RAN", "ROM", MaskPROM, PROM, EPROM, EEPROM, NVRAM "flash memory", cache, and other well-known random access technologies.

STORAGE, as used herein, refers to any type of digital storage technologies and mechanisms, sometimes referred to as secondary memory, usually without fully random access and/or with access times longer than that of primary memory. Examples of STORAGE technologies include magnetic disks, optical disks, magnetic tape, flash memory, semiconductor memory, solid state drives, memory sticks, SD cards and the like.

COMPUTERIZED PERSONAL SYSTEMS is used herein to refer to any fixed or portable CPU-based devices or equipment available for individual use, including desktop personal computers, laptop personal computers, notebook personal computers, smart-phones including iPhones™ and Android™ phones and Blackberries™; iPads™, Kindles™ and other similar devices; iPods™ and other digital audio devices; PDAs (personal data assistants), digital cameras, mobile phones, synthesizers, video games, GPS devices and the like.

"APP", as used herein, is a piece of software, such as an application. The APP can run on the Internet, on a computer, or on a phone, COMPUTERIZED PERSONAL SYSTEMS or other electronic device.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine", "calculate" and "compute," and variations thereof, as used herein, are used interchangeably and include any type of methodology, process, mathematical operation or technique.

It shall be understood that the term "means" as used herein shall be given its broadest possible interpretation in accordance with 35 U.S.C. §112, Paragraph 6. Accordingly, a claim incorporating the term "means" shall cover all structures, materials, or acts set forth herein, and all of the equivalents thereof. Further, the structures, materials or acts and the equivalents thereof shall include all those described in any portion of this document. Any one or more of the embodiments herein can therefore be claimed using means-type language.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

These and other features and advantages of this invention are described in, or are apparent from, the following detailed description of the exemplary embodiments.

BRIEF DESCRIPTION OF THE DRAWINGS

The exemplary embodiments of the invention will be described in detail, with reference to the following figures, wherein.

DETAILED DESCRIPTION

Figure 1:
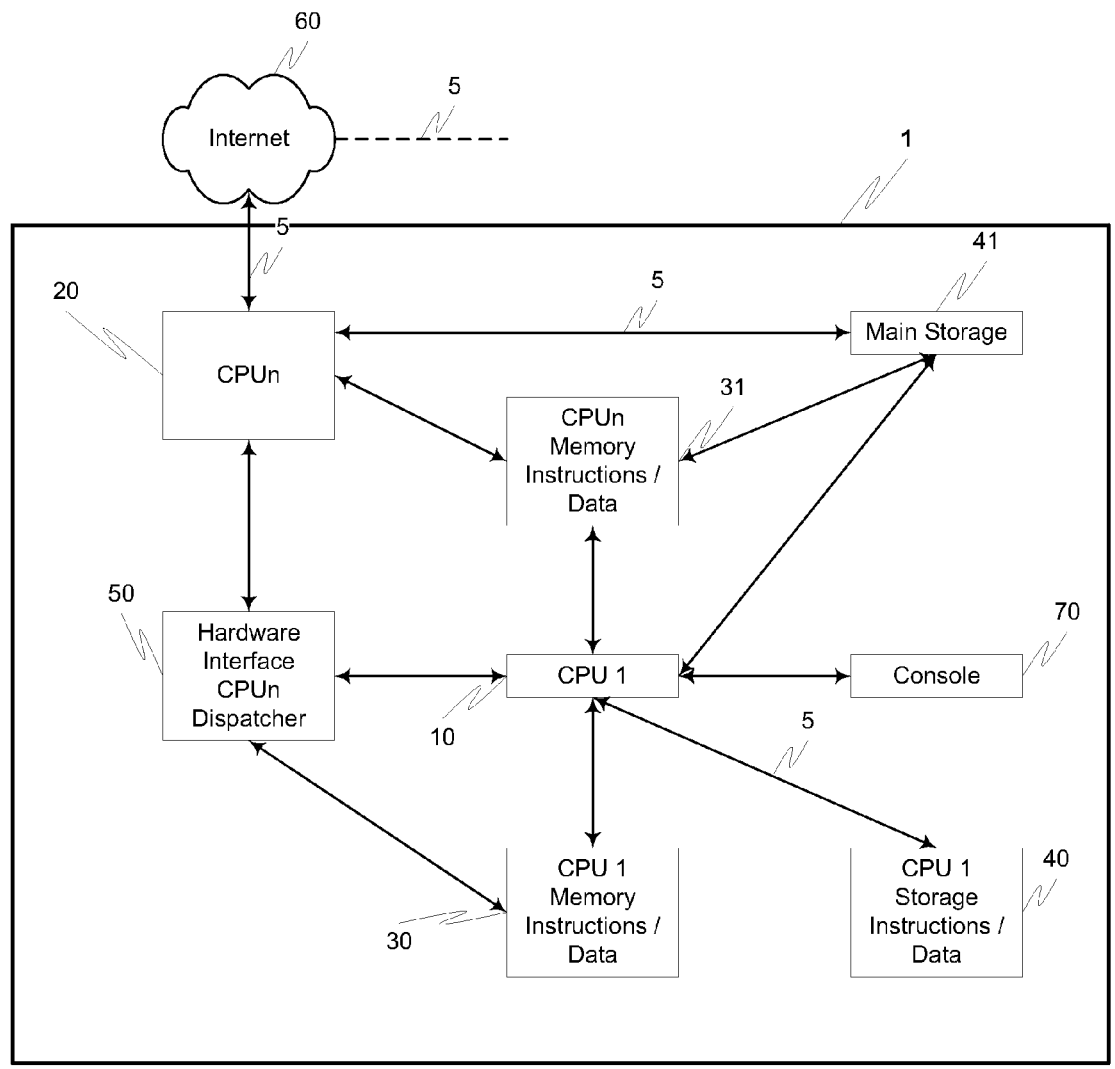
FIG. 1 shows a block diagram of an exemplary computing system disclosed herein.

FIG. 1 shows a block diagram of an exemplary computing system 1 disclosed herein connected by various links 5. The processor unit 10 that executes the control program (CPU 1), has a private memory 30 (CPU 1 MEMORY), and private optional storage 40 (CPU1 STORAGE) as well as connection to an operator's console 70 (CONSOLE).

The processor unit 10 also has conventional privately (non-Internet) connected Input/Output units, not shown. The processor unit 10 is also connected with the hardware and/or firmware interface unit 50 (HARDWARE INTERFACE CPUn DISPATCHER), and also has a connection with the memory 31 (CPUn MEMORY), and MAIN STORAGE 41. CPU1 10 is the primary, overriding, director controlling all the various elements it is connected to.

CPUn 20 is the processing unit that executes user programs (there may be multiple CPUn's, each with its own CPUn MEMORY 31, and there may be multiple MAIN STORAGE units 41). The CPUn(s) 20 are connected to their respective memory 31 (CPUn MEMORY) and to the MAIN STORAGE 41 which contains user programs and data. CPUn 20 is also connected to HARDWARE INTERFACE CPUn DISPATCHER 50, which enforces controls on CPUn's executions.

CPUn 20 can have any desired Instruction Set Architecture (ISA) augmented by special instructions to communicate with the HARDWARE INTERFACE CPUn DISPATCHER 50 and thereby with CPU 1 10. CPU 1 10 can have any desired ISA, augmented with instructions designed for its use to communicate with HARDWARE INTERFACE CPUn DISPATCHER 50, with CPUn MEMORY 31, with MAIN STORAGE 41, with CONSOLE 70, with its own CPU 1 MEMORY 10, with CPU 1 STORAGE 40, and/or with conventional in-house input/output units by private non-Internet connections.

An exemplary embodiment of the Case Secure Computer System Architecture obtains its secure characteristics by several key deviations from the architectures in common use today, but looks and acts very much like today's computers to users. There is a control subsystem whose computing engine CPU 1 10 has a private memory CPU 1 MEMORY 30 and optional private storage CPU 1 STORAGE 40 which contains system control programs and system control data, and it executes system control functions.

An example of the use of this subsystem is as follows: CPU 1 10 boots itself in a conventional manner, goes through an initialization, and asks for input from the operations staff via CONSOLE 70 and/or from privately-connected conventional I/O devices (not shown) attached to CPU 1 10 via secure means. Upon receiving an order to start a user process, the control program obtains the required specifications of needed programs from its CPU 1 MEMORY 30 and/or CPU 1 STORAGE 40.

Using these specifications, the CPU 1 10 establishes a control block unique to that process in its memory CPU 1 MEMORY 30 containing the parameters of the process. The exemplary control block parameters include: (1) the address and the amount of space used in memory 31 (CPUn MEMORY), separately for the instructions and the data, (2) data defining execution parameters such as the maximum total execution time allowed for this process and the maximum contiguous execution time to be allowed, and (3) the definition of the data in the database 41 (MAIN STORAGE) which the process is allowed to access and whether that access is read or read/write. When these and any other needed parameters have been assembled in a control block, the control program allocates space in CPUn MEMORY 31 and loads the program into CPUn MEMORY 31 from the program library in MAIN STORAGE 41, and would then notify HARDWARE INTERFACE CPUn DISPATCHER 50 to start the program, by executing a unique instruction designed for this purpose and which provides the location of the control block to the HARDWARE INTERFACE CPUn DISPATCHER 50. The HARDWARE INTERFACE CPUn DISPATCHER 50 then starts the execution in CPUn 20 by initializing its instruction counter.

The HARDWARE INTERFACE CPUn DISPATCHER 50 constantly monitors the execution to ensure its addresses, both instruction and data addresses, did not exceed the assigned address space in CPUn MEMORY 31, and that its access to data in MAIN STORAGE 41 agrees with the permitted limits defined in the control block, and that its execution times are within bounds specified in the control block.

If any of these limits are attempted to be violated by CPUn 20 the HARDWARE INTERFACE CPUn DISPATCHER 50 halts the execution and posts the control program. The control program, making its rounds, would encounter the post and take a pre-defined action to handle the situation, such as collecting the parameters of the error and sending notification to a system programmer and erasing the task from the CPUn's MEMORY 30. Dynamic program calls by an executing user program in CPUn 20 can be made by a special program call instruction to the control program via HARDWARE INTERFACE CPUn DISPATCHER 50. Additional user programs could be initiated by the control program in CPU 1 10, resulting in multiprogramming in CPUn 20. HARDWARE INTERFACE CPUn DISPATCHER 50 contains logic to allocate execution time to each process released by the control program in CPU 1 10. As discussed hereinafter, an optional methodology for managing user programs is described, making use of multiple virtual memories in the user subsystem to enforce these same principals to control user program execution.

CPUn 20 does not boot at power-up. Instead its instruction counter is set to null, and it begins execution only when HARDWARE INTERFACE CPUn DISPATCHER 50 initializes its instruction counter.

The following is an example of the use of the Internet connection 60. The control program establishes a partition in CPUn 20 with an Internet interface program which communicates with the Internet. Incoming information it receives is put in a data area. The user program interprets the data to determine which user program to call and notifies CPU 1 10 to initiate a program to process the data. The called user program processes the data, accessing that part of MAIN STORAGE 41 it is authorized to access, and makes a responding return message for the Internet access program to send.

User programs communicate with the operations staff via a special instruction in CPUn 20 that notifies HARDWARE INTERFACE CPUn DISPATCHER 50 of the location in CPUn MEMORY 31 of information to be displayed. HARDWARE INTERFACE CPUn DISPATCHER 50 then posts CPU 1 10 of the availability of the message, and CPU 1 10 then displays the message on the console, such as a display, in such a way as to ensure the operator would know its origin. The response of the operator could be relayed by the control program to the originating space in CPUn MEMORY 31.

The security of the installation depends of course on the physical security of the computer installation. Operational security depends on the operations staff and the programming staff, especially the system programming staff. Operations security could be enhanced by having a console that requires two persons to each insert a key whenever any change is to be made to the control information.

Figure 2:
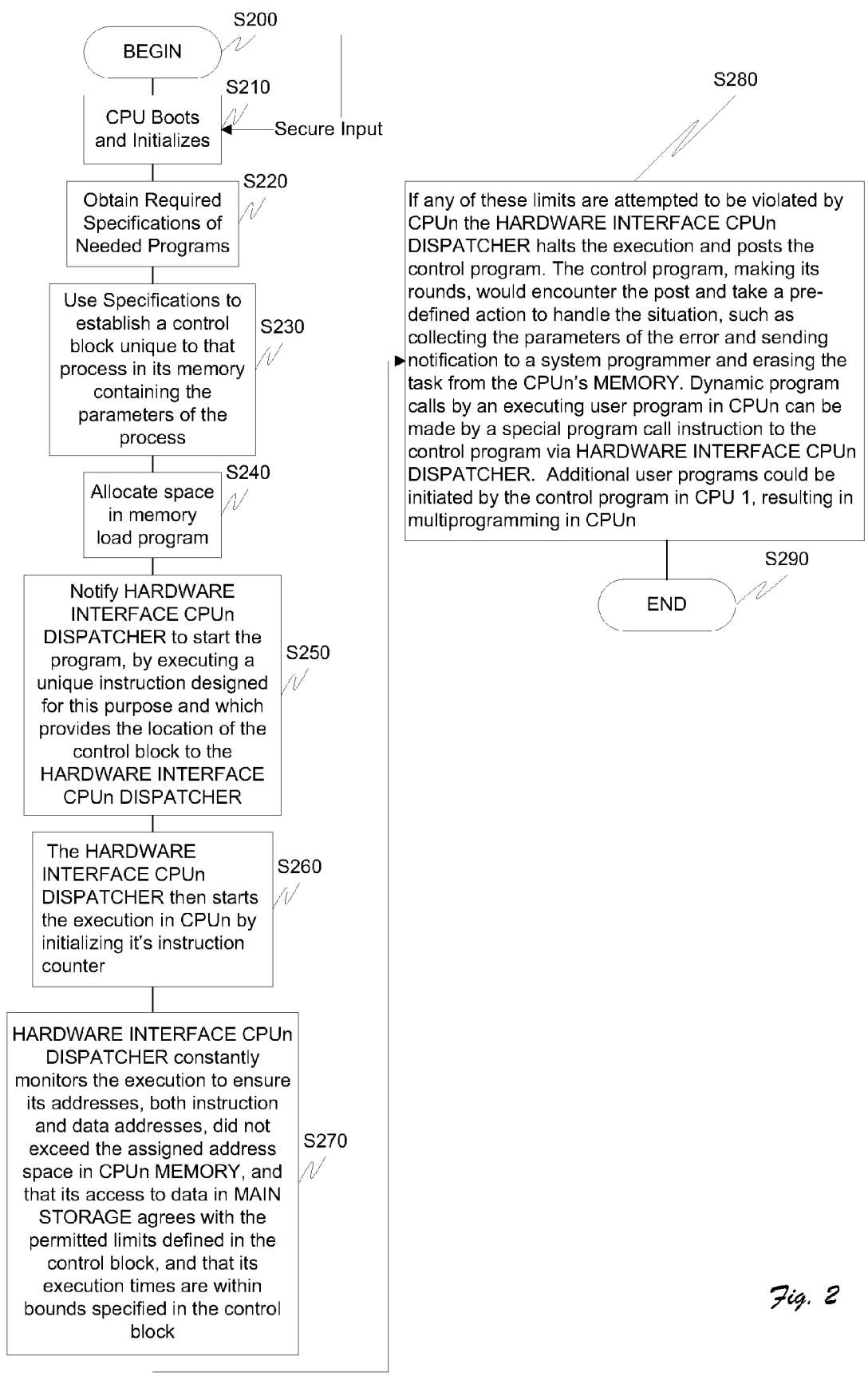
FIG. 2 is illustrates an exemplary method of secure computer management according to an exemplary aspect of the invention.

FIG. 2. illustrates an exemplary method of secure computing device operation. In particular, control begins in step S200 and continues to step S210. In step S210, CPU 1 boots itself in a conventional manner, goes through an initialization, and asks for input from the operations staff via CONSOLE and/or from privately-connected conventional I/O devices (not shown) attached to CPU 1 via secure means. Upon receiving an order to start a user process, in Step S220, the control program obtains the required specifications of needed programs from its CPU 1 MEMORY and/or CPU 1 STORAGE.

In step S230, and using these specifications, CPU 1 establishes a control block unique to that process in its memory CPU 1 MEMORY0 containing the parameters of the process. The exemplary control block parameters include: (1) the address and the amount of space used in memory 31 (CPUn MEMORY), separately for the instructions and the data, (2) data defining execution parameters such as the maximum total execution time allowed for this process and the maximum contiguous execution time to be allowed, and (3) the definition of the data in the database (MAIN STORAGE) which the process is allowed to access and whether that access is read or read/write. When these and any other needed parameters have been assembled in a control block, in step S240, the control program allocates space in CPUn MEMORY and in step S250 loads the program into CPUn MEMORY from the program library in MAIN STORAGE, and then notifies HARDWARE INTERFACE CPUn DISPATCHER to start the program, by executing a unique instruction designed for this purpose and which provides the location of the control block to the HARDWARE INTERFACE CPUn DISPATCHER. The HARDWARE INTERFACE CPUn DISPATCHER in step S260 then starts the execution in CPUn 20 by initializing it's instruction counter. Control then continues to step S270.

In step S270, the HARDWARE INTERFACE CPUn DISPATCHER constantly monitors the execution to ensure its addresses, both instruction and data addresses, did not exceed the assigned address space in CPUn MEMORY, and that its access to data in MAIN STORAGE agrees with the permitted limits defined in the control block, and that its execution times are within bounds specified in the control block.

In step S280, if any of these limits are attempted to be violated by CPUn the HARDWARE INTERFACE CPUn DISPATCHER halts the execution and posts the control program. The control program, making its rounds, would encounter the post and take a pre-defined action to handle the situation, such as collecting the parameters of the error and sending notification to a system programmer and erasing the task from the CPUn's MEMORY. Dynamic program calls by an executing user program in CPUn can be made by a special program call instruction to the control program via HARDWARE INTERFACE CPUn DISPATCHER. Additional user programs could be initiated by the control program in CPU 1, resulting in multiprogramming in CPUn.

The above scenarios were intended to illustrate the high level of security achievable with this architecture. Some applications of this design might compromise security somewhat in order to have compatibility with contemporary Internet browsers which require the admission into the system of executable code from the Internet winch is not encrypted. An example of how this might be accomplished while still ensuring a high level of security would be to establish a user partition containing a conventional Internet browser. (The browser partition would need to be classified as both instructions and data, which the control program via HARDWARE INTERFACE-CPUn DISPATCHER 50 might do by defining congruent areas of instruction execution addresses and read/write data access). By using the dynamic constraints described above to contain the execution within that partition, any potential malware activity would be constrained to very limited, known, area of the user part of the system. By using the available properties of the architecture, any storage of information outside of this partition can be prohibited, and if the entire partition is erased after each such use, there can be no malware remaining in the system. If information were allowed to be retained, classified as data, it could never be executed.

This exemplary architecture may well take various forms as it is adapted to the many incarnations of stored program computers in the modern world, but where security from malware is needed, the fundamental principles described should prove useful.

Another exemplary benefit of the architecture might well prove valuable to the computer industry: the environment in which computer programming is performed, both system (control) programming and user programming, can be expected to be less complex and have fewer bugs. User programs, being dynamically constrained, will be less able to have undesirable systemic effects.

As used herein, the term control program as a generic synonym for supervisor or operating system.

In contrast, to prior approaches, an exemplary embodiment protects the control program code and data by completely preventing user program access to it, and dynamically monitors addresses to confine changes to prescribed areas of user information.

In accordance with another exemplary optional embodiment, there is a routine for register storage during task switching. More specifically, an exemplary handling of register storage when an executing task is switched off is that the HARDWARE INTERFACE/CPUn DISPATCHER store the registers used in CPUn in the Control Block for that task in CPU1 MEMORY. When the task is re-dispatched, HARDWARE INTERFACE/CPUn DISPATCHER retrieves the data from the Control Block and restores the registers.

In accordance with another exemplary optional embodiment, for the displaying of information on the console screen, in exemplary use, the display on the console screen is under complete supervision by the CONTROL PROGRAM. The primary use of the display is to provide operational information to the operator-user. The CONTROL PROGRAM also accesses input from CPUn tasks for display. Exemplary use includes presenting user task information in a unique window in such a way that no task can masquerade as being the CONTROL PROGRAM.

In accordance with another exemplary optional embodiment, for Input/Output operations, there are two kinds of CPU's in this architecture, each might have I/O devices attached. An exemplary use could be as follows: CPU 1 devices are critical security risks, and must be physically safeguarded so they do not provide any risky access to CPU 1's MEMORY or STORAGE. An exemplary arrangement may have no I/O input devices attached, relying on updating of the CONTROL PROGRAM via encrypted internet or LAN connections, using, for example, the drivers in CPUn to control connections to these devices.

Other exemplary uses of this architecture: I/O devices connected to CPUn are less risky than with conventional architectures, as exemplary supervision by the CONTROL PROGRAM can be used to control user programs and devices. This architecture provides opportunities for specialized applications. The HARDWARE/DISPATCHER INTEFACE unit could, for example, provide dynamic monitoring of user program execution to limit the instruction set available to a user program. An exemplary use of such a feature could be to prevent write access to the Internet.

In accordance with yet another exemplary embodiment, one current concern over the security of computer systems leads to an examination of the vulnerabilities in today's computer architectures. The following primal vulnerabilities, some coming from the original Von Neumann concept of a stored program computer, others arising as a consequence of the evolutionary need for ever more complex operating system software, are evident:

User programs and CONTROL PROGRAMS are entangled in ways that make it difficult to address the security of either type of programs.

The two major classes of information in a computer system, namely (1) program instructions and (2) data, are not distinguished from each other by the hardware, creating the opportunity for confusion between them that can lead to security breaches.

Programs themselves are subject to dynamic changes. If unwanted changes are caused by malware, security breaches can occur. If such changes are caused by accident, such as by program bugs, unforeseen results can affect accuracy and security.

Programs are not always constrained by hardware-enforced limits on their reach, so that, however caused, unintended addresses can be generated and used in execution. Without address constraints, random damage can result.

A review of recent technology addressing improvements in computer security reveals increasingly complex designs. While various levels of protection have been devised for some situations, we have found no comprehensive solutions. An exemplary embodiment of the Case Secure Computer Architecture addresses the vulnerabilities listed above and has been invented to, for example, provide a comprehensive solution to defeating malware.

An exemplary embodiment of the Case Secure Computer System Architecture provides a paradigm change in the universal basic computer architecture that has existed since the 1940's, and is intended to apply, in whole or in part, to all future uses of computer-based technology, such as mainframe computers, host computers, server computers, application computers, data-base computers, mini-computers, microcomputers, firewall computers, computerized switches, routers, scientific computers, COMPUTERIZED PERSONAL SYSTEMS, Internet server computers, robotic computers, machine tool computers, industrial controllers, computerized industrial systems, computerized medical systems and devices, and pervasively to mechanisms wherever CPUs and MEMORIES are used. Usage is expected not only in situations where the security advantages of this architecture are needed, but also where increased reliability is needed.

An exemplary use of the read-only program feature of this architecture creates a need for programs to have a separate data space associated with them for temporary variables used during execution. In exemplary usage, compilers, interpreters, and the base system design would provide for such a data space for each such program. An exemplary use of this invention for use by programmers in a main-frame installation follows:

System programmers (privileged programmers who are authorized to modify the CONTROL PROGRAM) could use I/O devices which are privately connected to CPU 1 10 to access the control subsystem in a conventional manner, using pre-compiled binaries, or interpreters and compilers running in the control subsystem to update the CONTROL PROGRAM. User programmers could operate from I/O devices privately connected to CPUn 20. The libraries in Main Storage 41 could include the necessary compilers and other support tools, including temporary libraries for programs being debugged, sample data for testing new code, etc., all accessible under the supervision and control of the operations staff assisted by the CONTROL PROGRAM. User program workstations may not be connected to the Internet at any time, preventing malware from entering the system during the user programming process.

An exemplary alternative to the main-frame scenario above, applicable to server configurations, is one where workstations connected to the Internet and/or LANs (Local Area Networks) would be used by programmers for access to computer systems for modifying programs, both CONTROL PROGRAMS and user programs. In this scenario all network traffic entering a computer could initially be received and classified as data. Processing of this data would separate out the encrypted information intended for this computer and direct it to decryption processes where it would be authenticated and routed to appropriate processes. Information intended for updating the CONTROL PROGRAM and/or control data would be brought into the control subsystem by the CONTROL PROGRAM and acted upon, e.g., authenticated/decrypted, etc., there. This process would be facilitated by the ability of the CONTROL PROGRAM to reach into the user subsystem's MEMORIES and STORAGES. For security purposes the workstations used in this scenario would also adhere to the Case Secure Architecture to avoid their being contaminated by malware.

An exemplary use of this architecture in COMPUTERIZED PERSONAL SYSTEMS would be in a context in which the user is also the operator, the control program is usually supplied by a third party affiliated with the hardware vendor, and/or by the hardware vendor, and the user programs (some of which are called APPs) by still other vendors or suppliers. Program updates for these COMPUTERIZED PERSONAL SYSTEMS could typically be handled as described in the previous scenario, using secure communications with trusted sources, employing encryption or equivalent protection. The program providing an interface to the LAN or Internet for handling program updates would be a secure design which would not allow imported scripts to execute. Certified APPs which conform to this architecture and are from a trusted source could be handled this way as well. However, the current user environment includes many APPs that are subject to possible malware contamination, and they do not necessarily conform to the requirements of this architecture. If such programs are confined to defined partitions, it would ensure any malware could not contaminate the system. However, some APPs may require write access to the user's database, possibly causing data contamination. Use of the features of this architecture, wherein the CONTROL PROGRAM can restrict the access of any user program to appropriate data, could be used to limit such contamination.

Compatibility issues may also require the use of today's conventional browsers in some devices. A conventional browser could be supported in a read/write user partition. If the partition is erased after each use, any malware would be eliminated, and partition addressing constraints would prevent any access to the user database.

Another exemplary way of dealing with the need to allow current browser technology to co-exist with this new architecture would be to create virtual machines in partitions. This offers another encapsulation technique, whose value will depends on the circumstances.

An exemplary way of implementing addressing in the user sub-system would be to make the user sub-system a virtual memory sub-system. Programs could each have separate, unique, virtual memory spaces, and data files would each be in separate virtual memory address spaces. HARDWARE INTERFACE/CPUN DISPATCHER 50 could then monitor instruction executions to ensure they were in the designated virtual memory and data addresses in their virtual memory. A given task set up by CPU 1 10 CONTROL PROGRAM might have multiple virtual memories assigned to it. Virtual memories could be classified and identified as program or data repositories. CPU 1 10 CONTROL PROGRAM would be able to access the virtual memories in Main Storage 41, and to control their contents and classification.

Another exemplary way of handling addressing in the user CPUn(s) 20 would be to compile program and data addresses, respectively, with a base address of 0 (or 1) so that the CONTROL PROGRAM, when assigning space in CPUN MEMORY 31 for program instructions and data segments, respectively, could supply the offset from 0 (or 1) to the actual location assigned in CPUN MEMORY 31. This would make address monitoring in HARDWARE INTERFACE/CPUn DISPATCHER 50 straightforward by monitoring of the upper limit. The compiled addresses could be dynamically indexed by HARDWARE INTERFACE/CPUn DISPATCHER 50 to become the actual memory address used in execution.

A further exemplary use of the addressing methods outlined above would be to include in the CPUn instruction set an address tag which would indicate a particular segment to which the address applies. This would enable programs to share utilize code in different data segments, and execute as part of a single task. HARDWARE INTERFACE/CPUN DISPATCHER 50, assisted by the CONTROL PROGRAM in CPU 1 10 would use these tags to identify separate programs and/or data segments and control them to maintain the integrity of the addressing restrictions of the architecture in CPUn 20.

The exemplary systems and methods of this disclosure have been described in relation to management and display of a computing system or architecture. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a special purpose computer or server(s), or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowchart have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be at least partially readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A computer system comprising:
a first subsystem;
a control program that resides and executes in a control subsystem within the first subsystem that includes one or more CPU(s) each with an associated memory, wherein the control subsystem is protected by one or more of hardware and firmware from access by programs located in other parts of the system, and at least the associated memory of the control subsystem contains programs and data that constitute information required to manage, supervise, and support the system, wherein the control program further has access to information in a remainder of the system, and an ability to control processes and information in the remainder of the system; and
a second subsystem including one or more additional CPU(s) each with an associated memory, the second subsystem does not boot but begins execution upon receipt of an instruction from a control subsystem CPU via a hardware/firmware dispatcher, the second subsystem providing a facility for execution and storage of user programs and one or more of user data and databases, wherein the hardware/firmware dispatcher between the control subsystem and the second subsystem facilitates the ability of the control subsystem to manage and control the second subsystem, and buffers the control subsystem from the second subsystem and enables communication between the two subsystems, the hardware/firmware dispatcher between the control subsystem and the second subsystem insulates the control subsystem from any interference by the second subsystem by not allowing the second subsystem access to operating system memory or storage, and controls the dispatching and execution of user programs in the second subsystem in response to commands and data from the control subsystem, and relays information from the second subsystem to the control subsystem, the hardware/firmware dispatcher further providing dynamic monitoring of user program execution to limit an instruction set available to a user program in the second subsystem.

2. The system of claim 1, wherein the first subsystem further includes storage.

3. The system of claim 1, wherein the one or more additional CPU(s) in the second subsystem begin execution, their instruction counter having initially been set to null, only when the control subsystem, via the hardware/firmware dispatcher initializes the instruction counter.

4. The system of claim 3, wherein the second subsystem further includes storage.

5. A computer system, including a first subsystem a second subsystem, and a control program that resides and executes in a control subsystem within the first subsystem that includes one or more CPU(s) each including an associated memory, wherein the control subsystem is protected by one or more of hardware and firmware from access by programs located in other parts of the computer system, and at least the associated memory of the control subsystem contains programs and data that constitute information required to one or more of manage, supervise, and support the computer system, wherein the control program further has access to information in a remainder of the computer system, and an ability to control processes and information in the remainder of the computer system; and the second subsystem including one or more CPU(s) and associated memory, wherein the second subsystem does not boot but begins execution upon receipt of an instruction from a hardware/firmware dispatcher associated with the first subsystem, wherein user program instructions are controlled by one or more of hardware and firmware to be read-only, preventing instructions from modification during loading or execution, the hardware/firmware dispatcher between the first subsystem and the second subsystem insulates the first subsystem from any interference by the second subsystem by not allowing the second subsystem access to operating system memory or storage, and controls the dispatching and execution of user programs in the second subsystem in response to commands and data from the first subsystem, and relays information from the second subsystem to the first subsystem, the hardware/firmware dispatcher further providing dynamic monitoring of user program execution to limit an instruction set available to a user program in the second subsystem.

6. A computer system architecture including a first subsystem and a second subsystem, each subsystem including one or more CPU(s) and associated memory, respectively, and a control program that resides and executes in a control subsystem within the first subsystem, wherein the control subsystem is protected by one or more of hardware and firmware from access by programs located in other parts of the computer system, and at least the associated memory of the control subsystem contains programs and data that constitute information required to one or more of manage, supervise, and support the computer system, wherein the control program further has access to information in a remainder of the computer system, and an ability to control processes and information in the remainder of the computer system; and wherein the second subsystem does not boot but begins execution upon receipt of an instruction from a hardware/firmware dispatcher associated with the first subsystem wherein, by one or more of hardware and firmware, data is distinguished from instructions, enabling these two classes of information to be treated separately, the hardware/firmware dispatcher between the first subsystem and the second subsystem insulates the first subsystem from any interference by the second subsystem by not allowing the second subsystem access to operating system memory or storage, and controls the dispatching and execution of user programs in the second subsystem in response to commands and data from the first subsystem, and relays information from the second subsystem to the first subsystem, the hardware/firmware dispatcher further providing dynamic monitoring of user program execution to limit an instruction set available to a user program in the second subsystem.

7. The system of claim 1, wherein the control subsystem includes a CPU of the one or more CPUs running a kernel control program, and the one or more CPU's and associated memories are available for executing secure system services including one or more of encryption, storage of information and backups.

8. The system of claim 1, wherein the second subsystem memory utilizes a virtual memory organization, and unique, separate, virtual memories are used for programs and for data.

9. The system of claim 1, wherein an addressing scheme utilizes instruction set tags to identify segments within a partition, and segments may be data or instruction segments, and the tags enable relative addressing to be used for each segment.

10. A computer system including a first subsystem and a second subsystem, each subsystem including one or more CPU(s) and associated memory, respectively, and a control program that resides and executes in a control subsystem within the first subsystem, wherein the control subsystem is protected by one or more of hardware and firmware from access by programs located in other parts of the computer system, and at least the associated memory of the control subsystem contains programs and data that constitute information required to one or more of manage, supervise, and support the computer system, wherein the control program further has access to information in a remainder of the computer system, and an ability to control processes and information in the remainder of the computer system; and wherein the second subsystem does not boot but begins execution upon receipt of an instruction from a hardware/firmware dispatcher associated with the first subsystem, wherein one or more of hardware and firmware limit the dynamic addresses employed during the execution of a program to values specified by a control program, the hardware/firmware dispatcher between the first subsystem and the second subsystem insulates the first subsystem from any interference by the second subsystem by not allowing the second subsystem access to operating system memory or storage, and controls the dispatching and execution of user programs in the second subsystem in response to commands and data from the first subsystem, and relays information from the second subsystem to the first subsystem, the hardware/firmware dispatcher further providing dynamic monitoring of user program execution to limit an instruction set available to a user program in the second subsystem.

11. A computing device comprising:
a first subsystem containing one or more CPU(s) each with an associated memory and control programs and data; and a control subsystem protected by one or more of hardware and firmware from access by programs located in other parts of the device, wherein at least the associated memory of the control subsystem contains programs and data that constitute information required to one or more of manage, supervise, and support the computer system, wherein the control program further has access to information in a remainder of the computer system, and an ability to control processes and information in the remainder of the computer system; and
a second subsystem adapted for user program execution, wherein the first subsystem assembles a control block containing parameters to supervise a program's execution, and wherein a hardware/firmware dispatcher reads the control block and uses the information to initiate and control a user program executing in the second subsystem, including monitoring instruction and data addresses to ensure they so not exceed an assigned address space in memory and that the program's access to data agrees with a permitted limit defined in the control block, the hardware/firmware dispatcher between the first subsystem and the second subsystem insulates the first subsystem from any interference by the second subsystem by not allowing the second subsystem access to operating system memory or storage, and controls the dispatching and execution of user programs in the second subsystem in response to commands and data from the first subsystem, and relays information from the second subsystem to the first subsystem, the hardware/firmware dispatcher further providing dynamic monitoring of user program execution to limit an instruction set available to a user program in the second subsystem.

12. The system of claim 11, further comprising initializing and booting a control CPU in the first subsystem.

13. The system of claim 11, wherein secure input is received from one or more sources.

14. The system of claim 11, wherein an unauthorized user application or process is halted.

15. The system of claim 11, wherein a post is monitored and recognized.

16. The system of claim 11, further comprising the first subsystem collecting parameters associated with an error, sending notification to a system programmer and erasing a task from a CPU memory.

17. The system of claim 11, wherein the first subsystem allocates memory space and loading one or more programs into second subsystem memory.

18. The system of claim 11, wherein the first subsystem monitors execution times of the program.

19. The system of claim 11, wherein a control program residing on a secure CPU, assisted by a hardware/firmware interface unit sends an instruction to begin execution of the user program.

20. The system of claim 11, wherein a control program residing on the first subsystem performs the monitoring step.

* * * * *